(12) United States Patent
Goertz et al.

(10) Patent No.: US 12,352,559 B1
(45) Date of Patent: Jul. 8, 2025

(54) BACK-FACE DYNAMIC PROFILING SYSTEM

(71) Applicant: SURVICE Engineering Company, Belcamp, MD (US)

(72) Inventors: Alan Goertz, Grand Blanc, MI (US); Andrew D Brown, Abingdon, MD (US); Karin A Rafaels, Pylesville, MD (US)

( * ) Notice: Subject to any disclaimer, the term of this patent is extended or adjusted under 35 U.S.C. 154(b) by 554 days.

(21) Appl. No.: 17/824,049

(22) Filed: May 25, 2022

(51) Int. Cl.
*G01B 11/24* (2006.01)
*G01B 11/16* (2006.01)

(52) U.S. Cl.
CPC .............. *G01B 11/24* (2013.01); *G01B 11/16* (2013.01)

(58) Field of Classification Search
CPC ................................ G01B 11/24; G01B 11/26
See application file for complete search history.

(56) References Cited

U.S. PATENT DOCUMENTS

| | | | |
|---|---|---|---|
| 3,082,621 A | 3/1963 | Soderholm | |
| 4,715,235 A | 12/1987 | Fukui et al. | |
| 4,885,941 A | 12/1989 | Vardoulakis et al. | |
| 5,042,164 A | 8/1991 | Eppinger | |
| 5,115,680 A | 5/1992 | Lew | |
| 5,606,132 A | 2/1997 | Simpson | |
| 6,611,344 B1 * | 8/2003 | Chuang | G01B 11/24 348/E13.016 |
| 6,802,216 B2 | 10/2004 | van Schoor et al. | |
| 7,174,061 B2 | 2/2007 | Rougeault et al. | |
| 9,677,871 B2 * | 6/2017 | Schönleber | G01B 11/14 |
| 9,885,621 B2 | 2/2018 | Dunne et al. | |
| 10,393,498 B2 | 8/2019 | Chang et al. | |
| 2015/0226623 A1 | 8/2015 | Cavaliero et al. | |

* cited by examiner

*Primary Examiner* — Elias Desta
(74) *Attorney, Agent, or Firm* — Peter Loffler

(57) ABSTRACT

A dynamic profiling system comprises an initially planar grid formed by first parallel fibers and second parallel fibers oriented, advantageously, orthogonally to the first fibers. The two fiber sets may be woven or non-woven with respect to one another. As a force is placed on grid, each of the two sets of fibers are pulled into the limits of the grid as the grid pockets. The amount of each fiber pulled in, the measurement being fiber end movement measurement, length passage through a passageway, etc., is calculated and is used to form a three-dimensional model of the deformation shape.

27 Claims, 9 Drawing Sheets

BACK-FACE DYNAMIC PROFILING SYSTEM

STATEMENT REGARDING FEDERALLY SPONSORED RESEARCH OR DEVELOPMENT

This invention was made with Government support under Contract Number W911QX-16-D-0014 awarded by the US Army. The Government has certain rights in the invention.

BACKGROUND OF THE INVENTION

1. Field of the Invention

The present invention relates to a system that measures the back-face dynamic deformation of an object that is subject to a force such as an impact force or a creeping deformation.

2. Background of the Prior Art

Characterizing dynamic surface deformation of objects that are visually obscured by surrounding opaque surfaces is an ongoing challenge. A prime example being the measurement of the back-face (BF) dynamics of personal protective body armor, backed by clay, that is subjected to ballistic impact loading. Body armor is generally layered such that the dynamics of the front facing outer armor layer are not representative of the rear BF layer of the armor due to separation of interior opaque armor layers. The BF surface of the armor is normally in intimate contact with the clay so it cannot be directly observed.

Various schemes have been developed to measure 3-D shapes using thin planar sensing devices. A planar mesh using a two-layer orthogonal mesh of Fiber Bragg Grating (FBG) strands embedded in a 5 mm thick sheet of silicon was designed to measure 3-D shapes. FBG senses strain by measuring light reflection in the fiber optic strands. This device is not well suited to ballistic armor application since the 5 mm thick gelatin tends to alter the interaction between the armor BF and the backing object. In addition, it is unlikely the fibers can withstand or accommodate large deformations that often occur in armor BF dynamics subject to a ballistic impact. In a study, an FBG strand was woven into a Kevlar body armor panel, backed by gelatin, which was impacted by a 12.59 mm steel ball with a velocity of 425 m/s. The FBG slipped in the fabric so the FBG strains could not be used to determine BF dynamics, but the strains were correlated to observed BF dynamics determined by video through the gelatin. In follow-up studies, a method was devised to account for fiber slip by observing drops in FBG strain that allowed for estimating the BF displacement. The methodology requires knowing or estimating the initial velocity of the deformation, which significantly limits the technique to environments where that is possible.

What is needed is a system that measures back-face dynamic surface deformation of an object subject to impact loading or creeping deformation that overcomes the above-stated shortcomings found in the art. Specifically, such a system must not rely visual observations of the deformation process, must not interact with the object back-face in such a way so as to alter the measurement dynamics, must be able to withstand large impact forces, and must not require the measurement of the initial velocity of the deformation under measurement.

SUMMARY OF THE INVENTION

The back-face dynamic profiling system of the present invention addresses the aforementioned needs in the art by providing a system that measures back-face deformation without the need to rely on visual observations of the deformation process, does not interact with the object back-face so as to substantially alter the measurement dynamics, is able to withstand large impact forces, and does not require the measurement of the initial velocity of the deformation under measurement.

In general, grids consist of two or more sets of parallel fibers. The number and spacing of the fibers determines the measurable coverage area and the resolution capability, with more fibers closer together leading to a finer feature measurement resolution. The adjacent fibers in parallel fiber sets can be equal-spaced but need not be. Since the fibers need to bend with shape they are measuring, the fibers need to be compliant enough in bending and low enough in sliding friction to not substantially interfere with the deformation of the measured object. The required compliance will vary depending on the force that is causing the measured object to deform. If the fiber grid is woven, the stiffness and thickness of the fibers may limit how close adjacent parallel fibers can be spaced to avoid binding. Binding can also occur if the sliding friction of the fibers is too high. Binding stiffens the mesh and can cause the mesh to act like a restraining net, which can alter the BF deformation or result in fiber failures due to tensile strain. For high-speed applications, such as ballistic impacts, increased fiber stiffness can reduce the tendency of the fiber free ends to vibrate from stress wave and inertia effects whilst reducing the likelihood of fiber failure during the event.

Depending on the stiffness of the fibers, the size and shape of the object being measured and the grid plane's orientation with respect to gravity, the excess fiber lengths outside the grid may need guides or supports to maintain fiber alignment during experimental set-up and execution. An embodiment of this device utilizes a frame with separate channels for each fiber where the fibers ends may extend outside the channels allowing for visual observation of fiber movement or the channel frame may be translucent so fiber movement inside the channels can be observed—in either case, the length differential of the fiber within the grid is the actual item of interest. Frameless embodiments rely on adequately stiff fibers to maintain alignment with the grid or orientations where gravity loading settles compliant fibers in alignment, supported by existing structures, unrelated to the fiber grid device.

The fiber sets are oriented obliquely with respect to each other and are layered or interwoven with all layers aligned to the same plane. The angles of obliquity between the fiber sets can be regular (i.e., equal) or irregular. A regular angled two fiber-set grid has an orthogonal orientation between fiber sets. A regular angled three fiber-set grid has a 60° included angle between the fiber sets, a four fiber set has a 45° included angle between the fibers, and so on.

Irregularly oriented fiber sets may also be utilized. As fiber sets are aligned closer to parallel, the lateral positioning sensitivity is decreased. The region of intersection of the fibers defines the coverage area for determining dynamic displacements that are normal to the fiber plane. When more than two fiber sets are used, it is important to be mindful that grid displacements can only be calculated at positions where fibers intersect. Intersecting fibers may be routed through a small loop structure, such as a chainmail ring, provided the interior circumference is smooth and does not cause fiber binding. The loop structures reduce the tendency of the fibers to slide laterally during deformation.

Grid patterns with non-interwoven fiber embodiments are kept in position by any of the following techniques: 1)

clamping all or a portion of the intersecting fibers between two surfaces that are in-plane with the grid; 2) embedding the fibers in a single surface, such as clay; 3) affixing the fibers to the surface to be measured with mechanical fasteners that permit the fibers to slide along their lengthwise axis. In some configurations, the grid may be secured simply by gravity and/or surface friction. If the fibers are embedded in a substantially incompressible medium that flows in a direction perpendicular to the direction of deformation, a layer of buffer material, such as a fabric, may be required in between the fibers and the medium to prevent the fibers from sliding sideways during deformation.

Dynamic measurements that start in non-planar initial shapes are possible with this methodology. If the shape dynamics result in effective shortening of fibers within the bounds of the grid, the fibers will push-out instead of pull-in. In this case, the fibers should be stiff enough to push their unconstrained ends (outside the grid) without buckling. An example of this scenario is a dome shape that flattens.

The excess fiber lengths outside the grid do not need to maintain linear alignment with the fibers inside the grid. For example, all the fibers can be routed to terminate in the same orientation. Direction routing changes can be accomplished with channels (e.g. through bent tubes) or routed around pulleys. Furthermore, the excess fibers do not need to be oriented in the same plane as the grid. The ability to reroute the excess fibers may provide benefits for dynamical tracking fiber movement.

All of the previously described embodiments have both ends of the fibers free to translate; however, the methodology does not depend on both ends of the fibers being unconstrained. Therefore, all embodiments are functional with any number of the fibers with a single end fixed, in which case all fiber translation occurs at the free end.

BRIEF DESCRIPTION OF THE DRAWINGS

Similar reference numerals refer to similar parts throughout the several views of the drawings.

DESCRIPTION OF THE PREFERRED EMBODIMENT

Figure 1A:
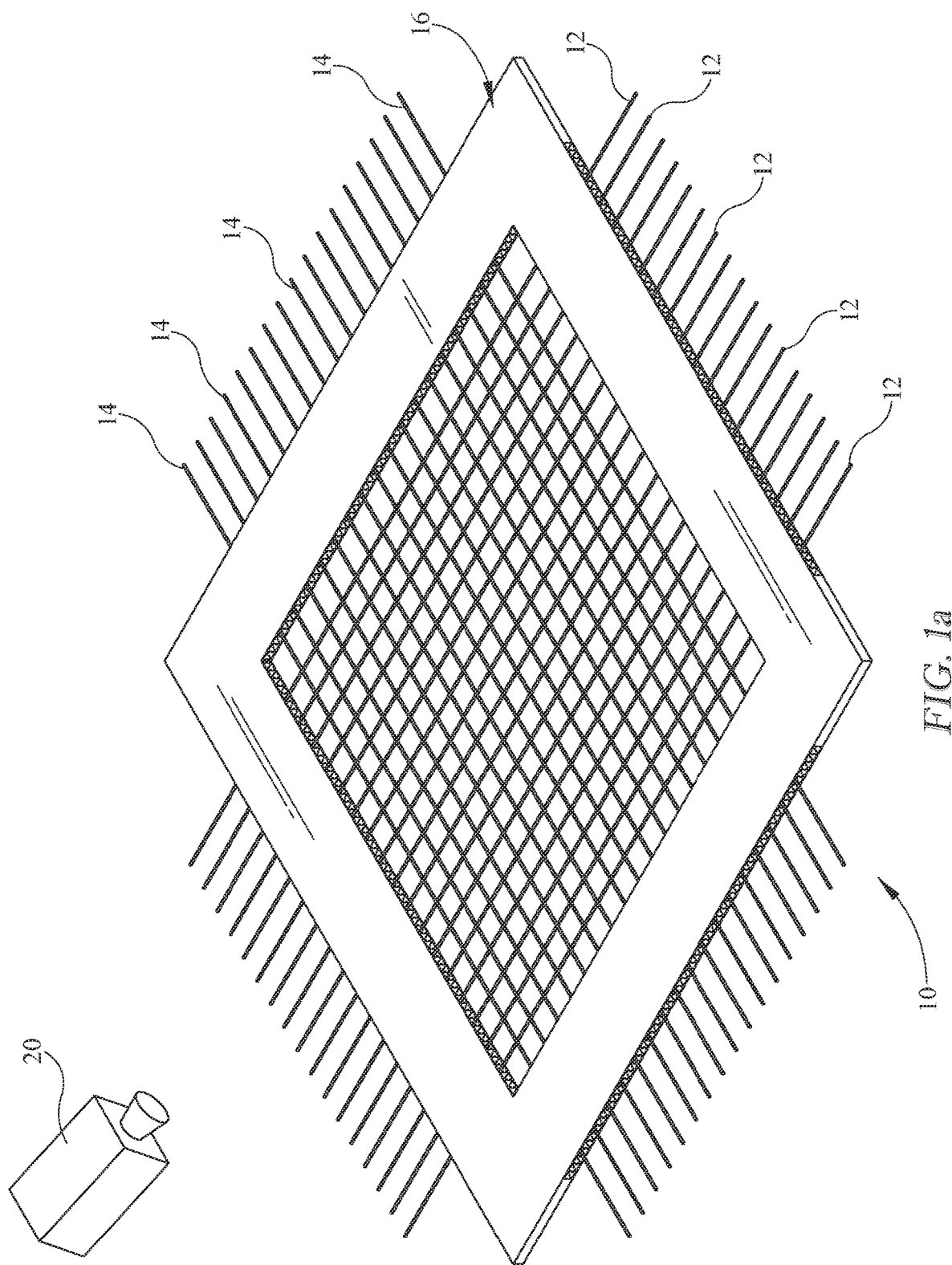
FIG. 1a is a perspective view of the back-face dynamic profiling system of the present invention in a woven configuration.
Figure 1B:
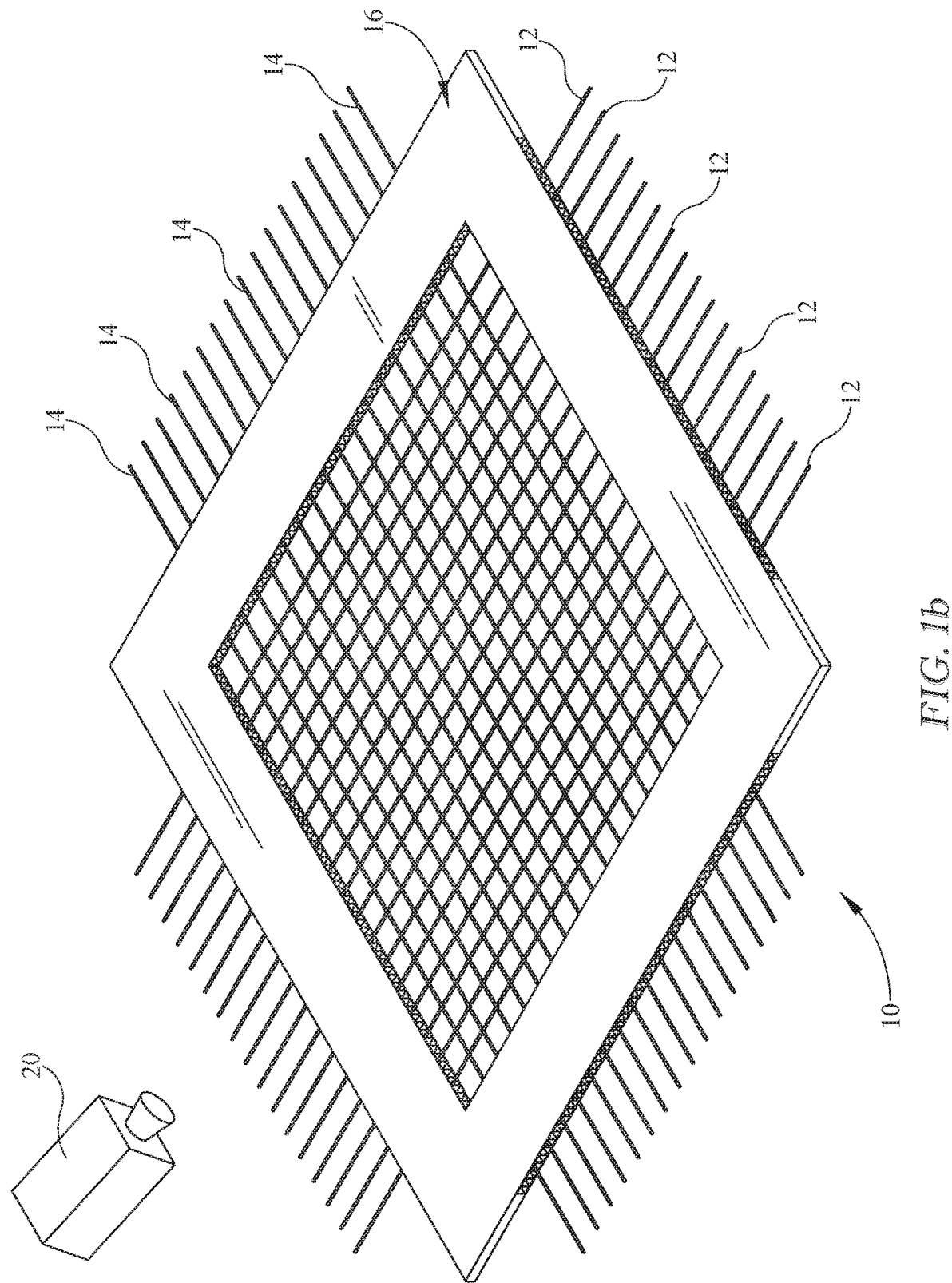
FIG. 1b is a perspective view of the back-face dynamic profiling system in a nonwoven configuration.
Figure 2A:
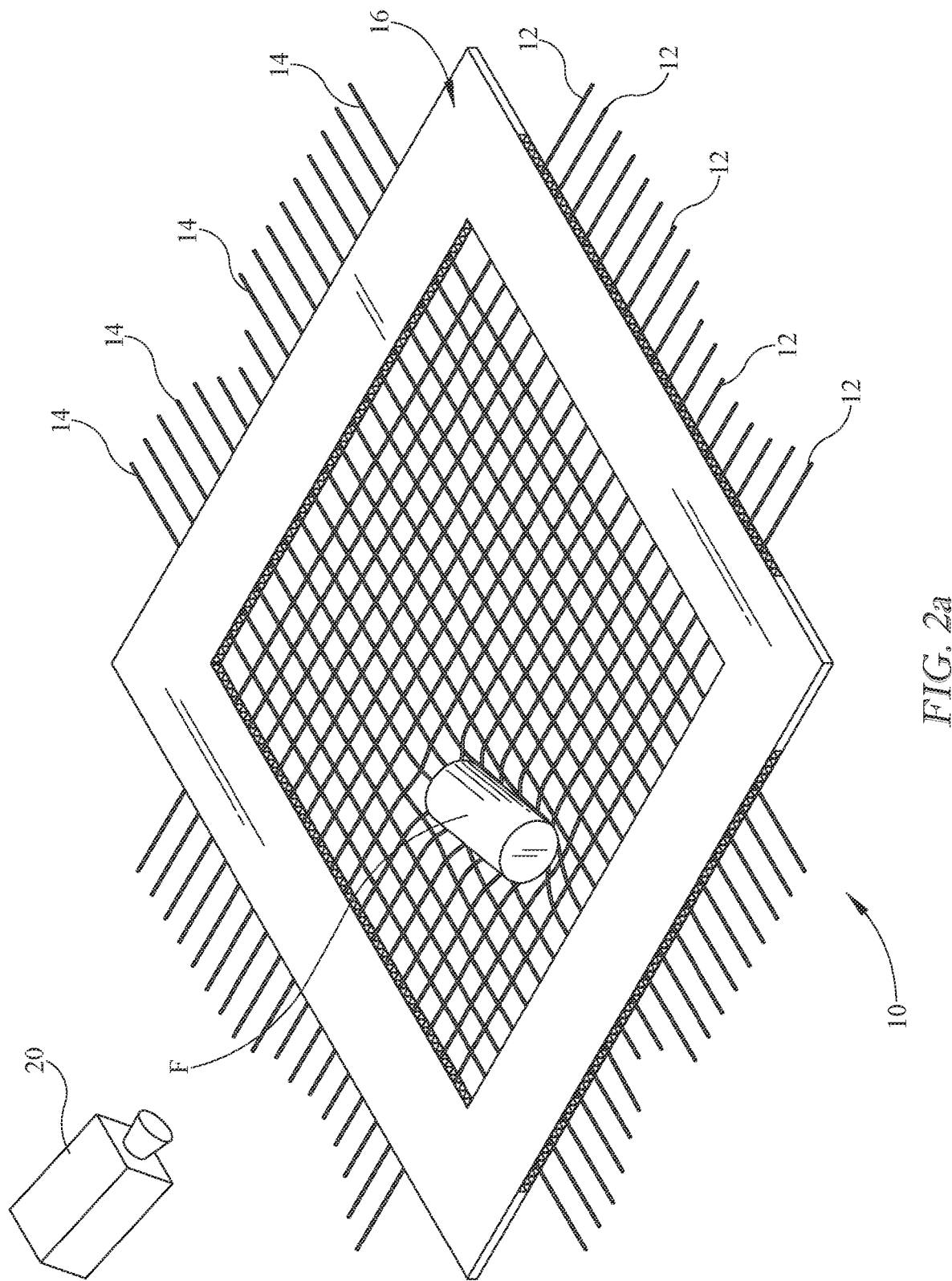
FIG. 2a is a perspective view of the back-face dynamic profiling system of FIG. 1a reacting to an impact.
Figure 2B:
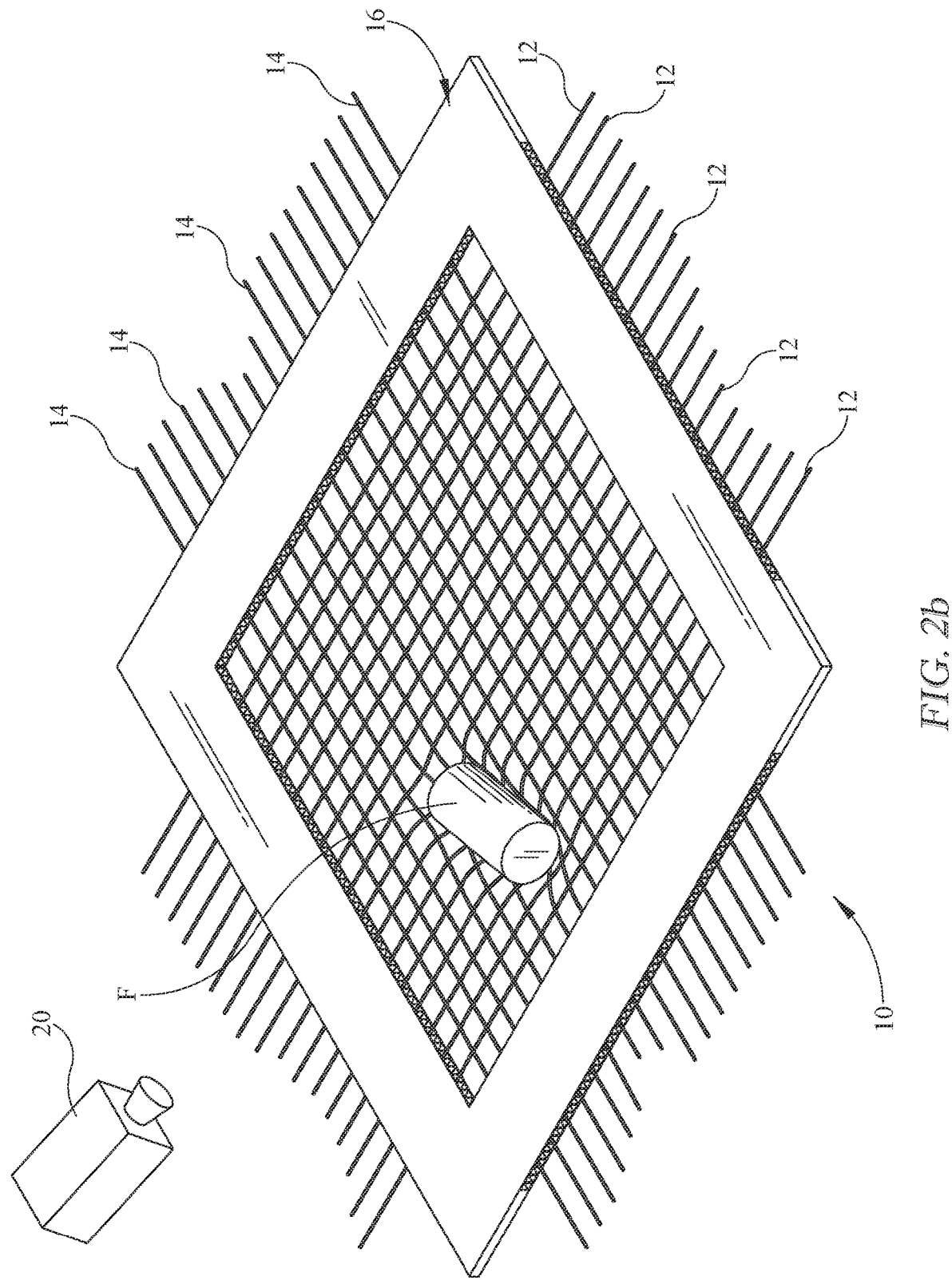
FIG. 2b is a perspective view of the back-face dynamic profiling system of FIG. 1b reacting to an impact.
Figure 3:
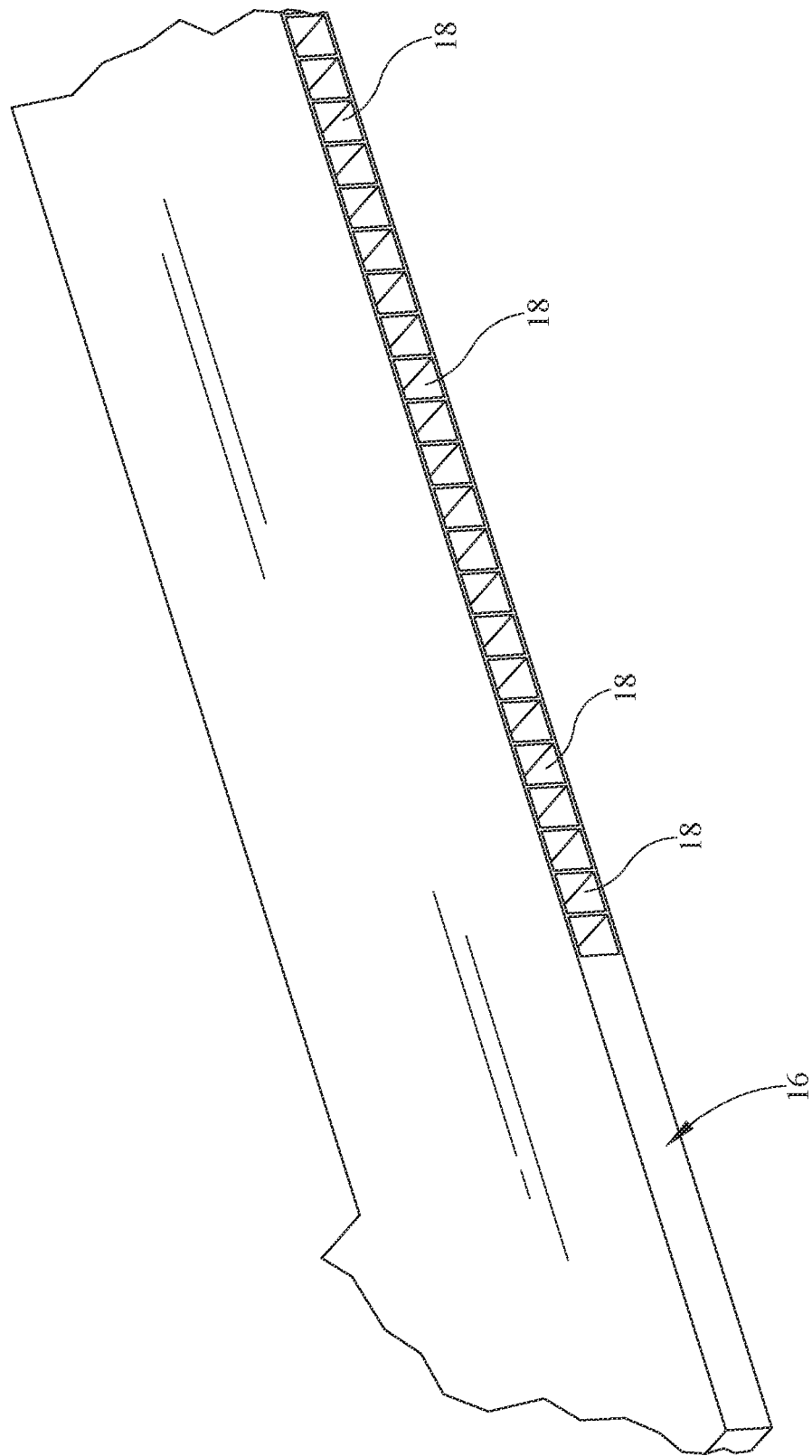
FIG. 3 is a close-up perspective view of a portion of the frame of the back-face dynamic profiling system.

Referring now to the drawings, it is seen that the back-face profiling system of the present invention, generally denoted by reference numeral 10, is comprised of a two-dimensional grid of high tensile strength, bendable fibers, which may be woven or unwoven with respect to one another. Specifically, as seen in FIGS. 1-4, a set of coextensive first fibers 12 is oriented in a first direction. All of the first fibers 12 may but need not necessarily be equidistantly spaced. A coextensive set of second fibers 14 is oriented in a second direction that is orthogonal to the first direction. All of the second fibers may but need not necessarily be equidistantly spaced. The first fibers 12 and the second fibers 14 may be held within a frame 16 where the frame 16 has passages 18 through which the respective fibers 12 and 14 pass in order to limit lateral movement of the fibers 12 and 14. The ends of the fibers 12 and 14 extend beyond the frame 16 a sufficient distance so as to prevent the ends of the fibers 12 or 14 from being drawn into the frame 16 and not be visible when the device is in use—alternately, the frame may be transparent or translucent in order to visually see inward fiber movement as more fully discussed below.

The back-face dynamic profiling system 10 is placed between two surfaces (not illustrated) of objects that are normally in contact so as to measure the dynamic shape of this obscured surface as deformation occurs. When the grid is subject to a loading force F (such as from an impacting projectile loading onto the object within which the back-face dynamic profiling system 10 is placed), creeping deformation, etc., the surface movement of the item draws the fibers 12 and 14 into the grid as the grid pockets. The magnitude of movement of each fiber 12 and 14, across all fibers 12 and 14 of the grid provides information about the obscured movement at each fiber 12 and 14 intersection. The magnitude of fiber 12 and 14 movement is captured by a camera 20, with an appropriate frame rate for the duration of the deformation event, which is capable of tracking the magnitude of movement between each video frame capture. The information captured by the camera 20 is fed into an appropriate software system that calculates the 3-dimensional contour of the obscured object for each video frame and is able to produce a visual dynamic 3-dimension picture of the obscured object throughout the deformation event period—alternately, fiber 12 and 14 movement can be captured using sensors including optical sensors, such as micro speed traps, or can be entirely electronic such as measuring changes in conductivity of the fibers.

If simply the end geometry of the of obscured object is desired (as opposed to a dynamic picture throughout the test period), then the fibers can be locked in their final position and a flexible membrane can be positioned into the grid with distributed pressure applied. Similarly, interim geometry can be replicated by repositioning and locking the fibers with the amount of draw recorded at any time of the deformation event, then applying the flexible membrane with distributed pressure.

The shape of a 3-dimension surface, overlaid with grid of contour lines, can be calculated using length differences between contour surface lines and their projected lengths on a base plane by using best-fit optimization to calculate right trapezoid Z-heights between adjacent contour line points of intersection. This methodology can be implemented using an X-Y planar grid of woven flexible fibers with excess lengths of fibers outside the grid. Ideally, the grid will be large enough that the grid perimeter completely encompasses the deforming region of interest. The fibers 12 and 14 should be free to slide along their lengths in principal direction with minimal resistance. When the grid fibers 12 and 14 are displaced to follow a contoured surface, a length of the excess fibers from outside the grid is 'pulled in' to reflect the longer profile lengths in their curved configuration. The amount of pull-in represents the length differentials of the fibers between their contoured versus plane-projected forms. The pull-in can occur at either or both ends of each fiber 12 and 14 and the length change is the sum of both pull-ins. By tracking interim fiber 12 and 14 pull-in lengths over time, the dynamics of the shape deformation can be determined. The interim fiber 12 and 14 length changes at each sample time step provide the information necessary to determine the deformed shape at that time step and can be sequenced together to provide the dynamic deformation-time history.

Figure 7:
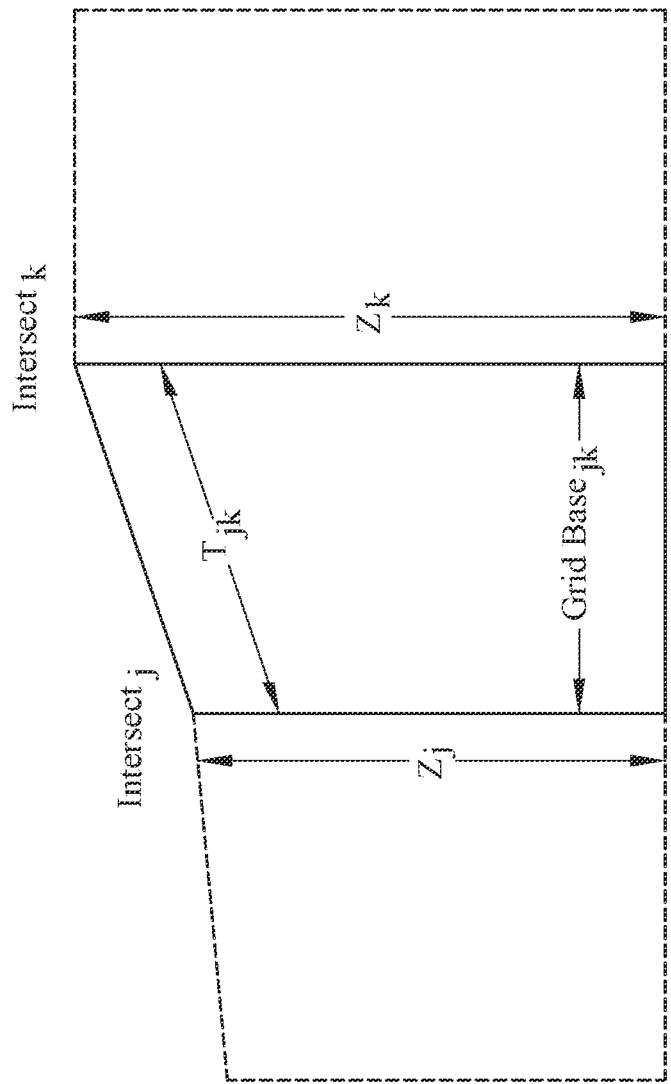
FIG. 7 is a function chart of the Intra-fiber intersection right trapezoid. Intersect$_j$ and Intersect$_k$ fiber intersections.

The methodology for determining the deformed grid shape involves solving an optimization problem with u unknowns, k knowns and c constraints. The unknown count is the number of fiber intersections, each with an unknown Z-height or displacement (normal to the grid). The known count is the number of fibers 12 and 14, each with a measured length differential between their initial and deformed states. The constraints are derived from two types of relationships, both relating to the right trapezoids formed between adjacent fiber intersections (FIG. 7). The first is the Z-heights at each fiber intersection are coincident and have to be equal (e.g., $Z_j$ and $Z_k$). The second is the sum of the lengths of the fiber segments between grid intersections, $T_{jk}$, must equal the sum of their initial lengths, Grid Base$_{jk}$, plus the amount of fiber 12 and 14 'pull-in' for each row or column (or minus the amount of 'push-out'). For an m row by n column grid, u equals m×n, k equals m+n, and c is fiber-length sums (m+n) plus coincident Z-heights at fiber intersections (m×n). It is the abundance of constraints that allow the optimization to solve for that lack of knowns compared to unknowns.

Figure 4:
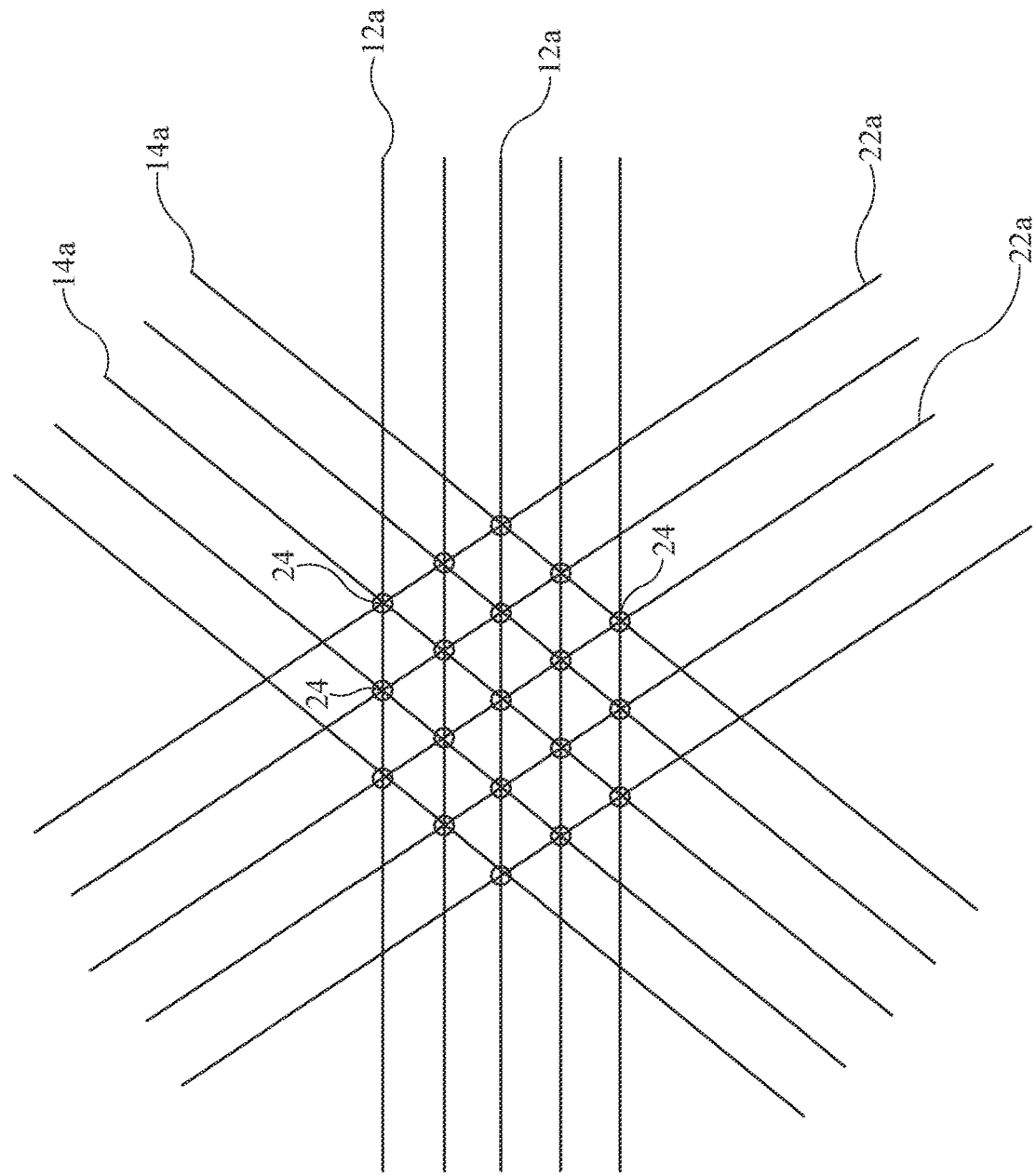
FIG. 4 is a plan view of the back-face dynamic profiling system utilizing a three fiber set with the fiber sets arranged regularly.
Figure 5:
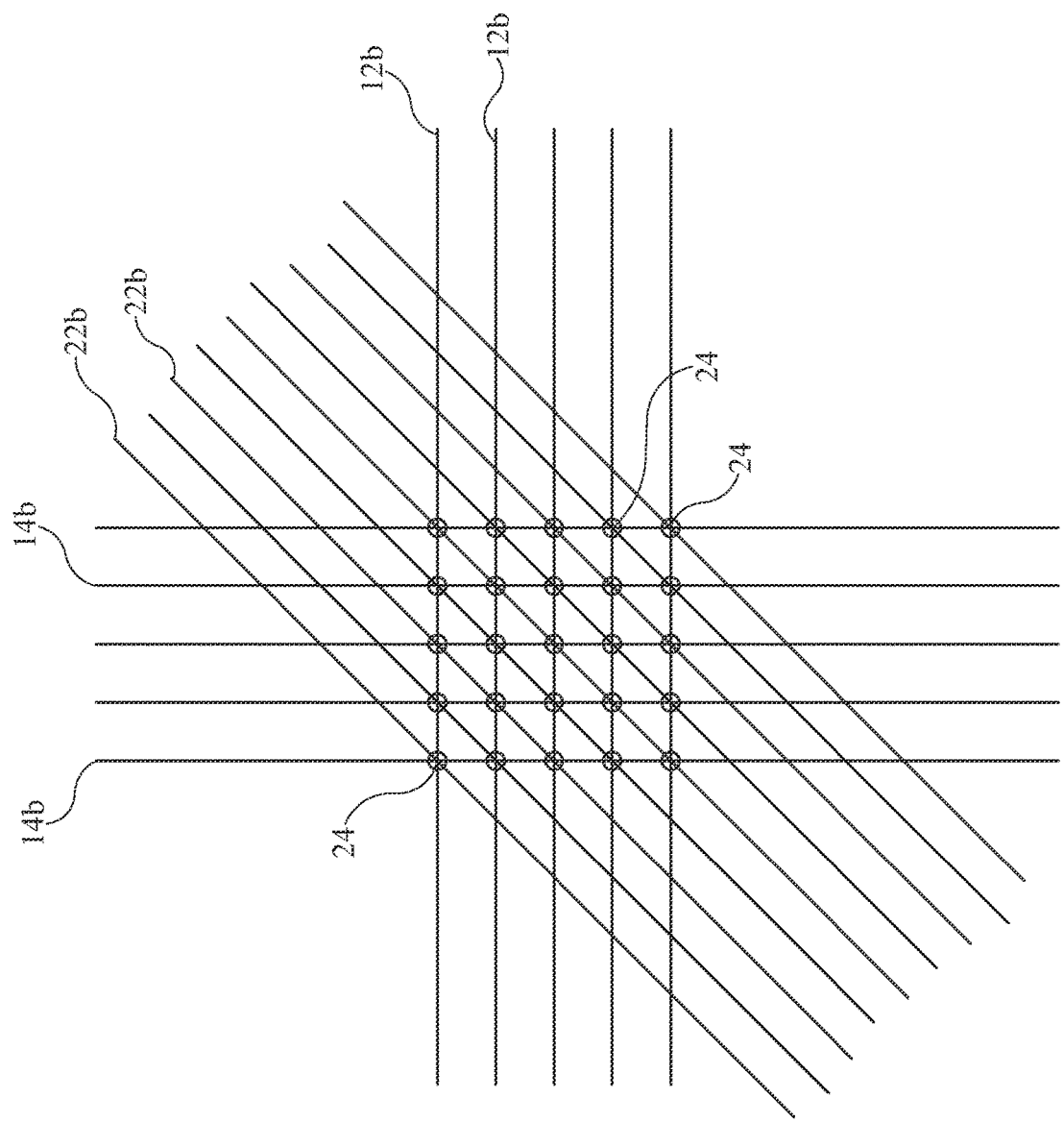
FIG. 5 is a plan view of the back-face dynamic profiling system utilizing a three fiber set with the fiber sets arranged irregularly.

Additional fiber sets with different orientations can be incorporated in the grid to increase the number of knowns and constraints or effectively add 'redundancy' to the grid in the event of fiber malfunction(s). As seen in FIG. 4, a first fiber set 12*a*, parallel and possibly equidistantly spaced, a second fiber set 14*a*, parallel and possibly equidistantly spaced, and a third fiber set 22*a*, parallel and possibly equidistantly spaced, are provided such that the fiber sets 12*a*, 14*a*, and 22*a* are regularly angled with one another (60 degrees between each fiber set). As seen in FIG. 5, a first fiber set 12*b*, parallel and possibly equidistantly spaced, a second fiber set 14*b*, parallel and possibly equidistantly spaced, and a third fiber set 22*b*, parallel and possibly equidistantly spaced, are provided such that the fiber sets 12*b*, 14*b*, and 22*b* are irregularly angled. As fiber sets are aligned closer to parallel, the lateral positioning sensitivity is decreased. The region of intersection (defined at circles 24 of the fibers defines the coverage area for determining dynamic displacements that are normal to the fiber plane. It is important to be mindful that grid displacements can only be calculated at positions where fibers intersect. Intersecting fibers may be routed through a small loop structure, such as a chainmail ring, provided the interior circumference is smooth and does not cause fiber binding. The loop structures may reduce tendencies of the fibers to slide laterally during deformation.

Figure 6:
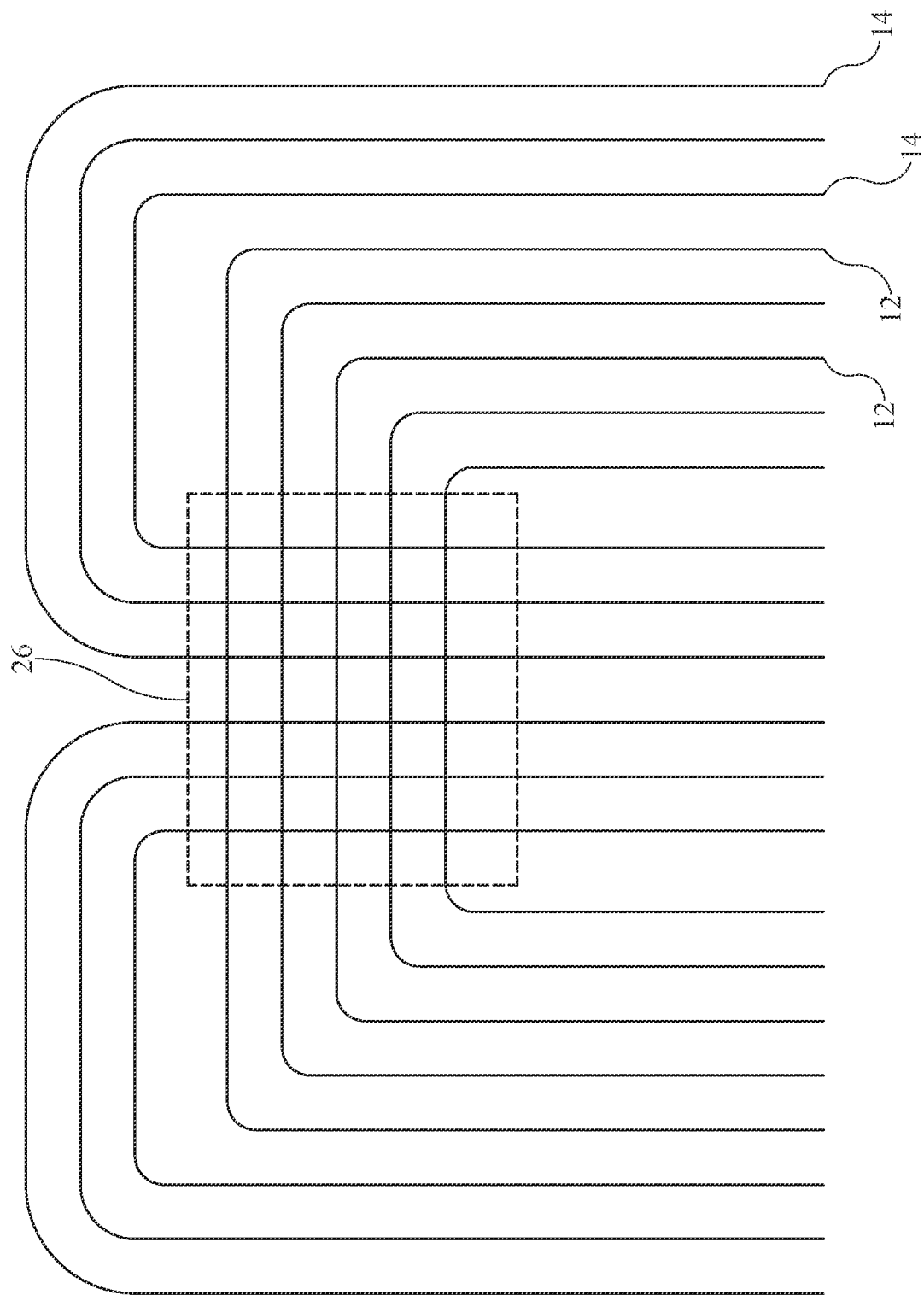
FIG. 6 is a plan view of the back-face dynamic profiling system wherein excess fiber portions are not linearly aligned with the fiber portions within the grid.

As seen in FIG. 6, excess fiber lengths outside the grid do not need to maintain linear alignment with the fibers inside the grid (the rectangular box outline 26 showing the actual functional portion of the grid). For example, all the fibers 12 and 14 could be routed to terminate in the same orientation. Direction routing changes can be accomplished with channels (e.g., through bent tubes) or routed around pulleys (neither illustrated). Furthermore, the excess fibers do not need to be oriented in the same plane as the grid. The ability to reroute the excess fibers 12 and 14 may provide benefits for dynamical tracking fiber movement.

While the invention has been particularly shown and described with reference to an embodiment thereof, it will be appreciated by those skilled in the art that various changes in form and detail may be made without departing from the spirit and scope of the invention.

We claim:

1. A method for calculating dynamic profiling comprising the steps of:
   forming a grid on a plane from a set of parallel first fibers, each first fiber having a first end and a second end, and a set of parallel second fibers, each second fiber having a third end and a fourth end such that the first fibers are not parallel with respect to the second fibers;
   applying an external impact force to the grid so that the grid is subject to a dynamic deformation from the impact force producing a 3-dimensional deformation contour;
   using a measurement device to measure and capture, a first length differential of each first fiber within the grid and a second length differential of each second fiber within the gird occurring between a first time period prior to application of the impact force onto the grid and a second time period occurring after the formation of the 3-dimensional deformation contour, the measured and captured first length differential measurements and the second length differential measurements collected as a data set;
   transmitting the data set to a computer; and
   using the computer to calculate the 3-dimensional deformation contour of the grid using the data set as input and thereafter having the computer produce a dynamic visual picture of the 3-dimensional deformation contour.

2. The method as in claim 1 wherein the set of first fibers is woven with the set of second fibers.

3. The method as in claim 1 wherein each of the first ends of each of the first fibers is fixed.

4. The method as in claim 3 wherein each of the third ends of each of the second fibers is fixed.

5. The method as in claim 1 further comprising the steps of:
   passing the first ends and the second ends of each of the first fibers through a series of parallel passages of a frame; and
   passing the third ends and the fourth ends of each of the second fibers through the series of parallel passages of the frame.

6. The method as in claim 5 wherein the frame is either transparent or translucent.

7. The method of claim 1 further comprising the steps of:
   placing a third set of fibers onto the grid, each third fiber having a fifth end and a sixth end;
   subjecting the third set of fibers to the impact force so that the third set of fibers are a part of the deformation;
   measuring, via the measurement device, a third length differential of each third fiber within the gird occurring between the first time period and the second time period; and
   adding the third length differential measurements to the data set prior to transmitting the data set to the computer.

8. The method as in claim 7 wherein the first fibers, the second fibers, and the third fibers are regularly angled.

9. The method as in claim 7 wherein the first fibers, the second fibers, and the third fibers are regularly angled.

10. A method for creating a solid model of a dynamic profile, comprising the steps of:
    forming a grid on a plane from a set of parallel first fibers, each first fiber having a first end and a second end, and a set of parallel second fibers, each second fiber having a third end and a fourth end such that the first fibers are not parallel with respect to the second fibers;
    applying an impact force to the grid so that the grid is subject to a deformation from the impact force so as to produce a 3-dimensional deformation contour;
    locking the fibers after the 3-dimensional deformation contour is formed; and
    creating the solid model of the deformation contour by applying a flexible membrane onto the grid with a distributed pressure, the membrane thereby producing the solid model.

11. The method as in claim 10, wherein the set of first fibers is woven with the set of second fibers.

12. The method as in claim 10 wherein each of the first ends of each of the first fibers is fixed.

13. The method as in claim 12 wherein each of the third ends of each of the second fibers is fixed.

14. The method as in claim 10 further comprising the steps of:
    passing the first ends and the second ends of each of the first fibers through a series of parallel passages of a frame; and
    passing the third ends and the fourth ends of each of the second fibers through the series of parallel passages of the frame.

15. The method as in claim 14 wherein the frame is either transparent or translucent.

16. The method of claim 10 further comprising the step of placing a third set of fibers onto the grid, each third fiber having a fifth end and a sixth end prior to the step of placing the force onto the grid.

17. The method as in claim 16 wherein the first fibers, the second fibers, and the third fibers are regularly angled.

18. The method as in claim 16 wherein the first fibers, the second fibers, and the third fibers are regularly angled.

19. A method for calculating dynamic profiling comprising the steps of:
    forming a grid on a plane from a set of parallel first fibers, each first fiber having a first end and a second end, and a set of parallel second fibers, each second fiber having a third end and a fourth end such that the first fibers are not parallel with respect to the second fibers;
    applying an external impact force to the grid so that the grid is subject to a dynamic deformation from the impact force producing a 3-dimensional deformation contour;
    using a measurement device to measure and capture, a first length differential of each first fiber within the gird and a second length differential of each second fiber within the gird occurring between a first time period prior to application of the impact force onto the grid and a second time period occurring during the formation of the 3-dimensional deformation contour;
    using the measurement device to measure and capture, a third length differential of each first fiber within the gird and a fourth length differential of each second fiber within the gird occurring between the first time period prior to application of the impact force onto the grid and a third time period occurring after the formation of the 3-dimensional deformation contour;
    the measured and captured first length differential measurements, the second length differential measurements, the third length differential measurements, and the fourth length differential measurements collected as a data set;
    transmitting the data set to a computer; and
    using the computer to calculate the 3-dimensional deformation contour of the grid using the data set as input and thereafter having the computer produce a dynamic visual picture of the 3-dimensional deformation contour.

20. The method as in claim 19 wherein the set of first fibers is woven with the set of second fibers.

21. The method as in claim 19 wherein each of the first ends of each of the first fibers is fixed.

22. The method as in claim 21 wherein each of the third ends of each of the second fibers is fixed.

23. The method as in claim 22 wherein the frame is either transparent or translucent.

24. The method as in claim 19 further comprising the steps of:
    passing the first ends and the second ends of each of the first fibers through a series of parallel passages of a frame; and
    passing the third ends and the fourth ends of each of the second fibers through the series of parallel passages of the frame.

25. The method of claim 19 further comprising the steps of:
    placing a third set of fibers onto the grid, each third fiber having a fifth end and a sixth end;
    subjecting the third set of fibers to the impact force so that the third set of fibers are a part of the deformation
    measuring, via the measurement device, a fifth length differential of each third fiber within the gird occurring between the first time period and the second time period and a sixth length differential of each third fiber within the gird occurring between the first time period and the third time period via the measurement device; and
    adding the fifth length differential measurements and the sixth length differential measurements to the data set prior to transmitting the data set to the computer.

26. The method as in claim 25 wherein the first fibers, the second fibers, and the third fibers are regularly angled.

27. The method as in claim 25 wherein the first fibers, the second fibers, and the third fibers are regularly angled.

* * * * *